(12) United States Patent
Hsu et al.

(10) Patent No.: US 12,405,638 B2
(45) Date of Patent: Sep. 2, 2025

(54) HINGE

(71) Applicant: FOSITEK CORPORATION, New Taipei (TW)

(72) Inventors: An-Szu Hsu, New Taipei (TW); Yang-Zhong Wu, Shenzhen (CN); An-Wei Chung, Kaohsiung (TW)

(73) Assignee: FOSITEK CORPORATION, New Taipei (TW)

( * ) Notice: Subject to any disclaimer, the term of this patent is extended or adjusted under 35 U.S.C. 154(b) by 166 days.

(21) Appl. No.: 18/524,788

(22) Filed: Nov. 30, 2023

(65) Prior Publication Data

US 2025/0093916 A1 Mar. 20, 2025

(30) Foreign Application Priority Data

Sep. 18, 2023 (CN) .......................... 202311200164.4

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC ............................. G06F 1/1652; G06F 1/1681
See application file for complete search history.

(56) References Cited

U.S. PATENT DOCUMENTS

| 8,804,349 | B2 * | 8/2014 | Lee | G06F 1/1652 |
| | | | | 361/679.01 |
| 8,938,856 | B1 * | 1/2015 | Shin | G06F 1/1681 |
| | | | | 16/365 |
| 9,218,022 | B2 * | 12/2015 | Tseng | G06F 1/1615 |
| 9,572,272 | B2 * | 2/2017 | Lee | H05K 5/30 |
| 10,440,840 | B2 * | 10/2019 | Ochi | E05D 7/00 |
| 10,743,427 | B2 * | 8/2020 | Huang | H05K 5/0217 |
| 11,073,870 | B2 * | 7/2021 | Yun | G09F 9/301 |
| 11,473,356 | B1 * | 10/2022 | Hsu | E05D 3/122 |
| 11,550,367 | B2 * | 1/2023 | Lin | G06F 1/1681 |
| 11,550,368 | B2 * | 1/2023 | Huang | H04M 1/022 |
| 11,599,157 | B2 * | 3/2023 | Jan | G06F 1/1624 |
| 11,624,221 | B1 * | 4/2023 | Hsu | E05D 3/122 |
| | | | | 16/354 |
| 11,656,659 | B2 * | 5/2023 | Choi | G06F 1/1681 |
| | | | | 361/679.27 |
| 11,681,335 | B1 * | 6/2023 | Hsu | G06F 1/1681 |
| | | | | 361/679.01 |

(Continued)

*Primary Examiner* — Vinh T Lam
(74) *Attorney, Agent, or Firm* — Birch, Stewart, Kolasch & Birch, LLP

(57) ABSTRACT

A hinge connectable with two housing parts to allow opening and closing thereof includes a mounting seat, two rotary units and two lateral support plates. The mounting seat has two first arcuate slots at two sides of a central line. The rotary units are connected with the mounting seat at the two sides of the central line for mounting the housing parts, and shiftable between an unfolded state and a folded state. Each rotary unit includes a linking member, a rail sliding block, a rotating bracket and an interposed sliding member interposed between the rail sliding block and the rotating bracket. The sliding of the rail sliding block relative to the rotating bracket can be steady and firm without the need to elongate the inclined rails of the rail sliding block and the rotating bracket, which renders the hinge more compact and slim.

8 Claims, 11 Drawing Sheets

(56) References Cited

U.S. PATENT DOCUMENTS

| | | | | |
|---|---|---|---|---|
| 11,706,886 B2* | 7/2023 | Wu | ...................... | H05K 5/0217 |
| | | | | 361/807 |
| 11,744,030 B2* | 8/2023 | Zhang | ...................... | F16C 11/04 |
| | | | | 361/807 |
| 11,809,228 B2* | 11/2023 | Hsu | ...................... | G06F 1/1681 |
| 11,914,433 B2* | 2/2024 | Liao | ...................... | H04M 1/0268 |
| 11,937,391 B2* | 3/2024 | Gong | ...................... | G06F 1/1681 |
| 11,960,328 B2* | 4/2024 | Jiang | ...................... | G06F 1/1652 |
| 11,963,323 B2* | 4/2024 | Zhang | ...................... | G09F 9/301 |
| 11,977,421 B2* | 5/2024 | Yang | ...................... | E05D 11/082 |
| 12,031,570 B2* | 7/2024 | Hsu | ...................... | G06F 1/1681 |
| 12,038,792 B2* | 7/2024 | Feng | ...................... | G06F 1/1681 |
| 12,045,097 B2* | 7/2024 | Kim | ...................... | G06F 1/1681 |
| 12,047,521 B2* | 7/2024 | Liao | ...................... | H04M 1/0268 |
| 12,079,047 B2* | 9/2024 | Hsu | ...................... | F16C 11/04 |
| 12,088,751 B2* | 9/2024 | Kim | ...................... | G06F 1/1679 |
| 12,139,949 B2* | 11/2024 | Mitsui | ...................... | H04M 1/0216 |
| 12,147,274 B2* | 11/2024 | Zhang | ...................... | H04M 1/022 |
| 12,173,541 B2* | 12/2024 | Chung | ...................... | G06F 1/1681 |
| 12,181,932 B2* | 12/2024 | Hsiang | ...................... | G06F 1/1652 |
| 12,200,885 B2* | 1/2025 | Ge | ...................... | H04M 1/022 |
| 12,219,723 B2* | 2/2025 | Park | ...................... | H05K 5/0226 |
| 12,221,998 B2* | 2/2025 | Hsu | ...................... | F16C 11/04 |
| 12,271,237 B2* | 4/2025 | Chang | ...................... | G06F 1/1681 |
| 12,274,015 B2* | 4/2025 | Zheng | ...................... | G06F 1/1652 |
| 12,279,387 B2* | 4/2025 | Yun | ...................... | G06F 1/1652 |
| 12,282,363 B2* | 4/2025 | Torres | ...................... | E05D 3/06 |
| 12,301,741 B2* | 5/2025 | Zhang | ...................... | G06F 1/1681 |
| 12,306,671 B2* | 5/2025 | Caplow-Munro | ...................... | G06F 1/1641 |
| 2021/0089084 A1* | 3/2021 | Chen | ...................... | G06F 1/1618 |
| 2023/0315147 A1* | 10/2023 | Kwak | ...................... | H04M 1/0268 |
| | | | | 455/575.4 |
| 2023/0409077 A1* | 12/2023 | Kim | ...................... | G06F 1/1681 |
| 2024/0206093 A1* | 6/2024 | Liao | ...................... | H05K 5/0226 |
| 2024/0344553 A1* | 10/2024 | Yang | ...................... | H05K 5/0226 |
| 2025/0184415 A1* | 6/2025 | Tang | ...................... | G09F 9/301 |

* cited by examiner

HINGE

CROSS-REFERENCE TO RELATED APPLICATION

This application claims priority to Chinese Patent Application No. 202311200164.4, filed on Sep. 18, 2023, and incorporated by reference herein in its entirety.

FIELD

The disclosure relates to a hinge, and more particularly to a hinge connectable with two housing parts of a flexible electronic device to allow opening and closing of the housing parts and for supporting a flexible display.

BACKGROUND

A conventional hinge for connecting with two housing parts of a flexible electronic device to allow opening and closing of the housing parts includes a mounting seat and two rotary units. Each rotary unit includes a linking member slidably engaged with the mounting seat along an arcuate track, a rail slider slidably engaged with the linking member along an arcuate track, and a rotating bracket pivotably connected with the mounting seat. The rail slider is slidably connected with the rotating bracket through an inclined slide rail. However, it is required to increase the dimension of the inclined slide rail to keep contact of the rail slider with the rotating bracket during the sliding movement so as to permit steady and firm sliding, which results in increment of the width and thickness of the rail slider and the rotating bracket and renders the hinge bulky and difficulty to make a thinned structure of the hinge.

SUMMARY

Therefore, an object of the disclosure is to provide a hinge that can alleviate at least one of the drawbacks of the prior art.

According to the disclosure, the hinge connectable with two housing parts of a flexible electronic device to allow opening and closing of the housing parts includes a mounting seat, two rotary units and two lateral support plates. The mounting seat extends in a lengthwise direction and has two lengthwise edges at two opposite sides of a central line. The mounting seat has two first arcuate slots which extend from the central line toward the lengthwise edges, respectively. The two rotary units are connected with the mounting seat at the two opposite sides of the central line, respectively. The two rotary units are shiftable between an unfolded state and a folded state. Each of the rotary units includes a linking member, a rail sliding block, a rotating bracket and an interposed sliding member. The linking member has a linking body which has a plate supporting surface, a first arcuate rail which extends from the linking body and which is slidably engaged with a respective one of the first arcuate slots, and a second arcuate rail which extends from the linking body away from the first arcuate rail. The rail sliding block has a block body which has a housing supporting surface for one of the housing parts to be attached thereto, a second arcuate slot which is formed in the block body and slidably engaged with the second arcuate rail, and an outward inclined sliding portion which is formed on the block body and opposite to the second arcuate slot in the lengthwise direction. The rotating bracket is pivotally connected with the mounting seat, and has a bracket body and an inward inclined guiding portion which extends from the bracket body to terminate at a terminal end. The inward inclined guiding portion has an inward inclined block, an inward guideway which is formed on the inward inclined block, and a first guiding slope which is formed on the terminal end of the inward inclined guiding portion and adjacent to the inward guideway. The interposed sliding member is interposed between the rail sliding block and the rotating bracket. The interposed sliding member has an inward inclined sliding portion which is slidably engaged with the inward inclined guiding portion, and an outward inclined guiding portion with which the outward inclined sliding portion is slidably engaged. The inward inclined sliding portion has an inward inclined slide rail with which the inward inclined block is slidably engaged, an inward key which is disposed on the inward inclined slide rail and is guided in and slidable along the inward guideway, and a second guiding slope which is formed on the second inward key and which is slidably engaged with the first guiding slope to guide slidable engagement of the inward key in the inward guideway. During the shifting of the rotary units from the unfolded state to the folded state, the rail sliding block is slid relative to the second arcuate rail of the linking member, and is turned relative to the mounting seat through sliding of the interposed sliding member relative to the rotating bracket. Each of the two lateral support plates is securely connected with and supported on the plate supporting surface of the linking member to be moved with the linking member. In the unfolded state of the rotary units, the plate supporting surfaces of the linking members are flush with each other and in a horizontal state and the lateral support plates are disposed to cover the mounting seat. In the folded state of the rotary units, the plate support surfaces are inclined to each other in a direction away from the mounting seat to bring the lateral support plates into inclination to each other, and the housing supporting surfaces of the rail sliding blocks are disposed to face and to be parallel to each other and to be in a vertical state.

With the interposed sliding member, the sliding of the rail sliding block to the rotating bracket can be steady and firm without the need to elongate the inclined rail (i.e., the outward inclined sliding portion) of the rail sliding block and the inclined rail (i.e., the inward inclined guiding portion) of the rotating bracket, which renders the hinge more compact and slim. Moreover, through the slidable engagement of the inward key with the inward guideway, the sliding movement of the interposed sliding member relative to the rotating bracket is guided and limited to avoid removal of the interposed sliding member from the rotating bracket. Furthermore, the first guiding slope is slidably engaged with the second guiding slope to facilitate the slidable engagement of the inward key in the inward guideway during assembly.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
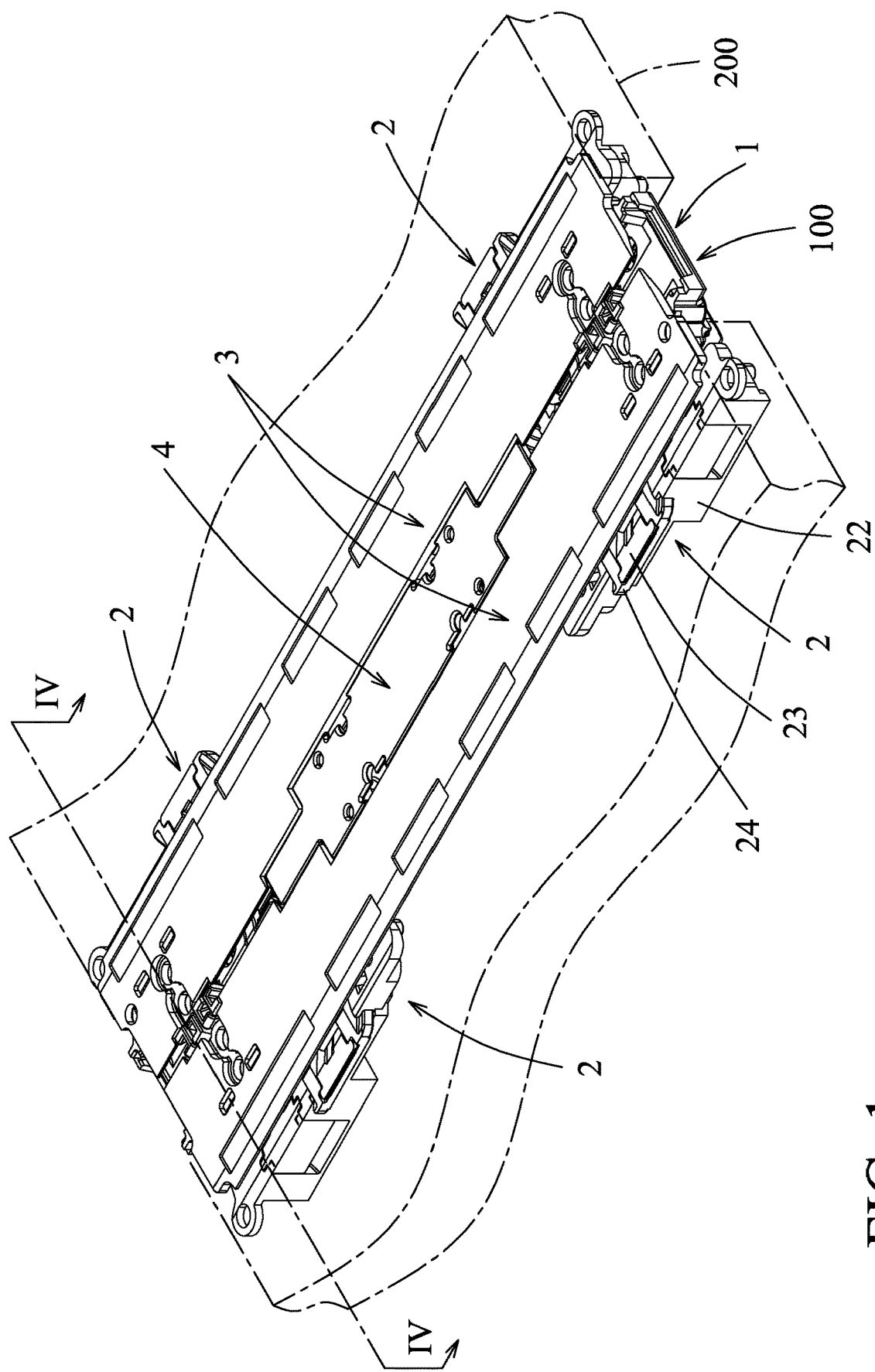
FIG. 1 is a perspective view illustrating an embodiment of a hinge according to the disclosure in an unfolded state.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 4, an embodiment of a hinge 100 according to the disclosure is adapted to be connected with two housing parts 200 of a flexible electronic device to allow opening and closing of the housing parts 200, and for supporting a flexible display 300. The hinge 100 includes a mounting seat 1, two pairs of rotary units 2, two lateral support plates 3, a central support plate 4 and two synchronizing mechanisms 5.

The mounting seat 1 includes an elongated seat body 11 extending in a lengthwise direction, an outer shell (not shown) mounted on a lower end of the elongated seat body 11, and two rail brackets 12 securely mounted on an upper end of the elongated seat body 11. The elongated seat body 11 has two lengthwise edges 111 at two opposite sides of a central line (C), and two guiding structures 112 arranged on the central line (C). Each guiding structure 112 has an upper end wall (112a) defining a guide hole (112b), and a surrounding wall (112c) extending downwardly from a periphery of the upper end wall (112a). The upper end wall (112a) and the surrounding wall (112c) cooperatively define a receiving space (112d) in communication with the guide hole (112b). The two rail brackets 12 are spaced apart from each other in the lengthwise direction. Each rail bracket 12 is formed with two first arcuate slots 121 which extend from the central line (C) toward the lengthwise edges 111, respectively.

Figure 8:
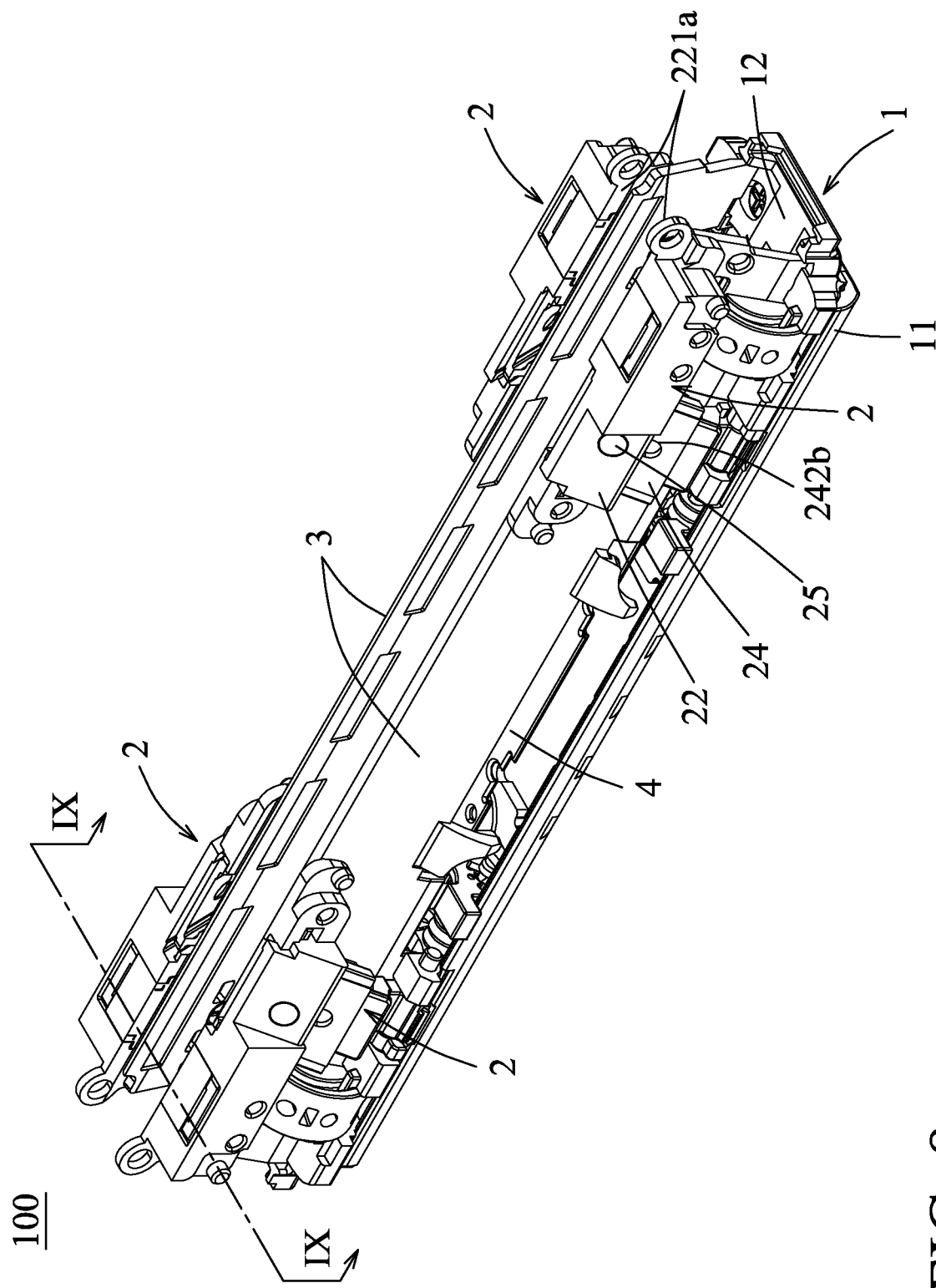
FIG. 8 is a perspective view of the embodiment in a folded state.

The two pairs of rotary units 2 are disposed on the two rail brackets 12, respectively. The two rotary units 2 of each pair are connected with the mounting seat 1 at the two opposite sides of the central line (C), respectively, to correspond with the two first arcuate slots 121, respectively, and for connecting with the two housing parts 200, respectively. The two rotary units 2 are shiftable between an unfolded state (as shown in FIG. 1) and a folded state (as shown in FIG. 8). Each rotary unit 2 includes a linking member 21, a rail sliding block 22, a rotating bracket 23 and an interposed sliding member 24.

With reference to FIG. 3 and FIGS. 5 to 7, the linking member 21 has a linking body 211 which has a plate supporting surface (211a), a first arcuate rail 212 which extends from the linking body 211 and which is slidably engaged with the respective first arcuate slot 121, and a second arcuate rail 213 which extends from the linking body 211 away from the first arcuate rail 212 (i.e., away from the mounting seat 1).

The rail sliding block 22 has a block body 221 which has a housing supporting surface (221a) for one of the housing parts 200 to be attached thereto, a second arcuate slot 222 which is formed in the block body 221 and slidably engaged with the second arcuate rail 213, and an outward inclined sliding portion 223 which is formed on the block body 221 and opposite to the second arcuate slot 222 in the lengthwise direction. The outward inclined sliding portion 223 has an outward inclined slide rail (223a) which is recessed and inclined relative to the housing supporting surface (221a), and an outward key (223b) which is disposed on and protrudes from an inward wall of the outward inclined slide rail (223a). In this embodiment, the outward key (223b) is in the form of a bolt portion of a fastener which extends through the rail sliding block 22. Specifically, a rivet 25 has a shaft which extends from an outward wall of the rail sliding block 22 therethrough to have a protrusion which serves as the outward key (223b). Alternatively, the outward key (223b) may be integrally formed with the block body 221 of the rail sliding block 22.

The rotating bracket 23 is pivotally connected with the mounting seat 1. The rotating bracket 23 has a bracket body 231, an inward inclined guiding portion 232 which extends from the bracket body 231 to terminate at a terminal end, and a toothed portion 233 which is formed on the bracket body 231 away from the inward inclined guiding portion 232. A pivot axle (231a) is disposed on the bracket body 231 and extends in the lengthwise direction to be journalled to the corresponding rail bracket 12 of the mounting seat 1 to permit rotation of the rotating bracket 23 about the pivot axle (231a). The inward inclined guiding portion 232 has an inward inclined block (232a), an inward guideway (232b) which is formed on the inward inclined block (232a), and a first guiding slope (232c) which is formed on the terminal end of the inward inclined guiding portion 232 and adjacent to the inward guideway (232b).

The interposed sliding member 24 is interposed between the rail sliding block 22 and the rotating bracket 23. The interposed sliding member 24 has an inward inclined sliding portion 241 which is slidably engaged with the inward inclined guiding portion 232, and an outward inclined guiding portion 242 with which the outward inclined sliding portion 223 is slidably engaged. The inward inclined sliding portion 241 has an inward inclined slide rail (241a) with which the inward inclined block (232a) is slidably engaged, an inward key (241b) which is disposed on the inward inclined slide rail (241a) and is guided in and slidable along the inward guideway (232b), a suspending arm (241c) which is connected with the inward key (241b) and extends from an inner wall of the inward inclined slide rail (241a), and a second guiding slope (241d) which is formed on the second inward key (241b) and is slidably engaged with the first guiding slope (232c) to guide slidable engagement of the inward key (241b) in the inward guideway (232b).

Through the slidable engagement of the inward key (241b) of the inward inclined sliding portion 241 of the interposed sliding member 24 with the inward guideway (232b) of the inward inclined guiding portion 232 of the rotating bracket 23, the sliding movement of the interposed sliding member 24 relative to the rotating bracket 23 is guided and limited to avoid removal of the interposed sliding member 24 from the rotating bracket 23. Moreover, the first guiding slope (232c) of the rotating bracket 23 formed on the terminal end of the inward inclined guiding portion 232 is slidably engaged with the second guiding slope (241d) of the interposed sliding member 24 to facilitate the slidable engagement of the inward key (241b) in the inward guideway (232b) for an assembling process. Furthermore, during the assembling process, the suspending arm (241c) is deformable to facilitate the slidable engagement of the inward key (241b) in the inward guideway (232b).

The outward inclined guiding portion 242 has an outward inclined block (242a) which is slidably engaged with the outward inclined slide rail (223a), and an outward guideway (242b) which is formed on the outward inclined block (242a). The outward key (223b) of the rail sliding block 22 is guided in and slidable along the outward guideway (242b). Through the slidable engagement of the outward key (223b) of the outward inclined sliding portion 223 of the rail sliding block 22 with the outward guideway (242b) of the outward inclined guiding portion 242 of the interposed sliding member 24, the sliding movement of the rail sliding block 22 relative to the interposed sliding member 24 is guided and limited to avoid removal of the rail sliding block 22 from the interposed sliding member 24. Also, a rivet 25 serving as the outward key (223b) extends from an outward wall of the rail sliding block 22 therethrough. The assembling process to connect the outward inclined sliding portion of the rail sliding block 22 with the outward inclined guiding portion 242 of the interposed sliding member 24 is convenient and easy to conduct.

Moreover, the inward inclined slide rail (241a) of the interposed sliding member 24 is in the form of a groove which is formed and recessed in an inward wall of the outward inclined block (242a). Specifically, in the unfolded state, the interposed sliding member 24 covers at least a portion of the rotating bracket 23, and the rail sliding block 22 is disposed outwardly and covers at least a portion of the interposed sliding member 24 and at least a portion of the rotating bracket 23.

With the interposed sliding member 24 interposed between the rail sliding block 22 and the rotating bracket 23, the sliding of the rail sliding block 22 to the rotating bracket 23 can be steady and firm without the need to elongate the inclined rail (i.e., the outward inclined sliding portion 223) of the rail sliding block 22 and the inclined rail (i.e., the inward inclined guiding portion 232) of the rotating bracket 23.

During the shifting of the rotary units 2 from the unfolded state to the folded state, the rail sliding block 22 is slid relative to the second arcuate rail 213 of the linking member 21, and is turned relative to the mounting seat 1 through the sliding of the interposed sliding member 24 relative to the rotating bracket 23.

Referring again to FIGS. 1 to 4, the two lateral support plates 3 are securely connected with and supported on the plate supporting surfaces (211a) of the linking members 21 of the two rotary units 2, respectively, to be moved with the linking members 21. In this embodiment, each lateral support plate 3 is disposed on two rotary units 2 at the same side of the central line (C). Each lateral support plate 3 has a first plate body 31, a notch 32 formed in an inward edge 311 of the first plate body 31, and a plurality of lifting posts 33 extending from the first plate body 31 toward the notch 32.

The central support plate 4 is movably disposed on the mounting seat 1. The central support plate 4 has a second plate body 41 and two guided posts 42 which are connected with the second plate body 41 and respectively and slidably inserted through the guide holes (112b) of the guiding structures 112. Each guided post 42 is inserted slidably and downwardly into the receiving space (112d), and a fastener, such as a screw (not shown), is securely connected with the guided post 42. A spring (not shown) is disposed between the upper end wall (112a) and a head of the fastener so as to bias the central support plate 4 downward toward the seat body 11 of the mounting seat 1.

With reference to FIGS. 2, 4, 5 and 7, in the unfolded state of the rotary units 2, the inward edges 311 of the lateral support plates 3 are adjacent to each other, the central support plate 4 is disposed in the space confined by the notches 32, and the lateral support plates 3 and the central support plate 4 cooperatively cover the mounting seat 1. Meanwhile in this state, the housing supporting surfaces (221a) of the rail sliding blocks 22 are parallel to the plate support surfaces (211a) of the rail sliding blocks 22, and the two housing parts 200 disposed on the housing supporting surfaces (221a) of the rail sliding blocks 22 are flush with the lateral support plates 3 disposed on the plate support surfaces (211a) of the rail sliding blocks 22 so as to support the flexible display 300 in a horizontal state. Also, in the unfolded state, the central support plate 4 is supported by the lifting posts 33 of the lateral support plates 3 so as to keep the central support plate 4 flush with the lateral support plates 3 for firmly supporting the flexible display 300.

With reference to FIGS. 8 to 11, in the folded state of the rotary units 2, the lateral support plates 3 are opposite to and face each other, and are slightly inclined toward each other such that the distance between the lateral support plates 3 is gradually decreased from the proximal sides that are proximate to the mounting seat 1 and the inward edges 311 to the distal sides that are distal from the mounting seat 1, and the central support plate 4 is biased toward the mounting seat 1 in a biased position. With the space confined by the notches 32 for accommodating flexible circuit boards (not shown) and other component parts (not shown) disposed on and connected between the two housing parts 200, damage to the flexible circuit boards and the other component parts is avoided during rotation of the hinge. Additionally, in the folded state, the housing supporting surfaces (221a) of the rail sliding blocks 22 are disposed to face and to be parallel to each other and to be in a vertical state. Specifically, the lateral support plates 3 are moved with the linking members 21, and the plate surfaces of the lateral support plates 3 are parallel to the plate support surfaces (211a) of the linking members 21.

Specifically, during the shifting of each rotary unit 2 from the unfolded state to the folded state, the first arcuate rail 212 of the linking member 21 is slid along the corresponding first arcuate slot 121. In the folded state, the plate support surfaces (211a) of the linking members 21 are inclined to each other in a direction away from the mounting seat 1 to bring the lateral support plates 3 to be inclined to each other, i.e., the distance between the lateral support plates 3 near the inward edges 311 is relatively larger. Also, the central support plate 4 that is disengaged from the lifting posts 33 of the lateral support plates 3 is biased by the spring downward toward the mounting seat 1. A teardrop shaped space is provided among the lateral support plates 3 and the central support plate 4 for receiving the bending portion of the flexible display 300 in the folded state. It is noted that the central support plate 4 is moved upward by the lifting posts 33 (see FIG. 4) from the biased position to the filling position during the shifting of the rotary units 2 from the folded state to the unfolded state, and is then supported by the lifting posts 33 to remain in the filling position.

Figure 3:
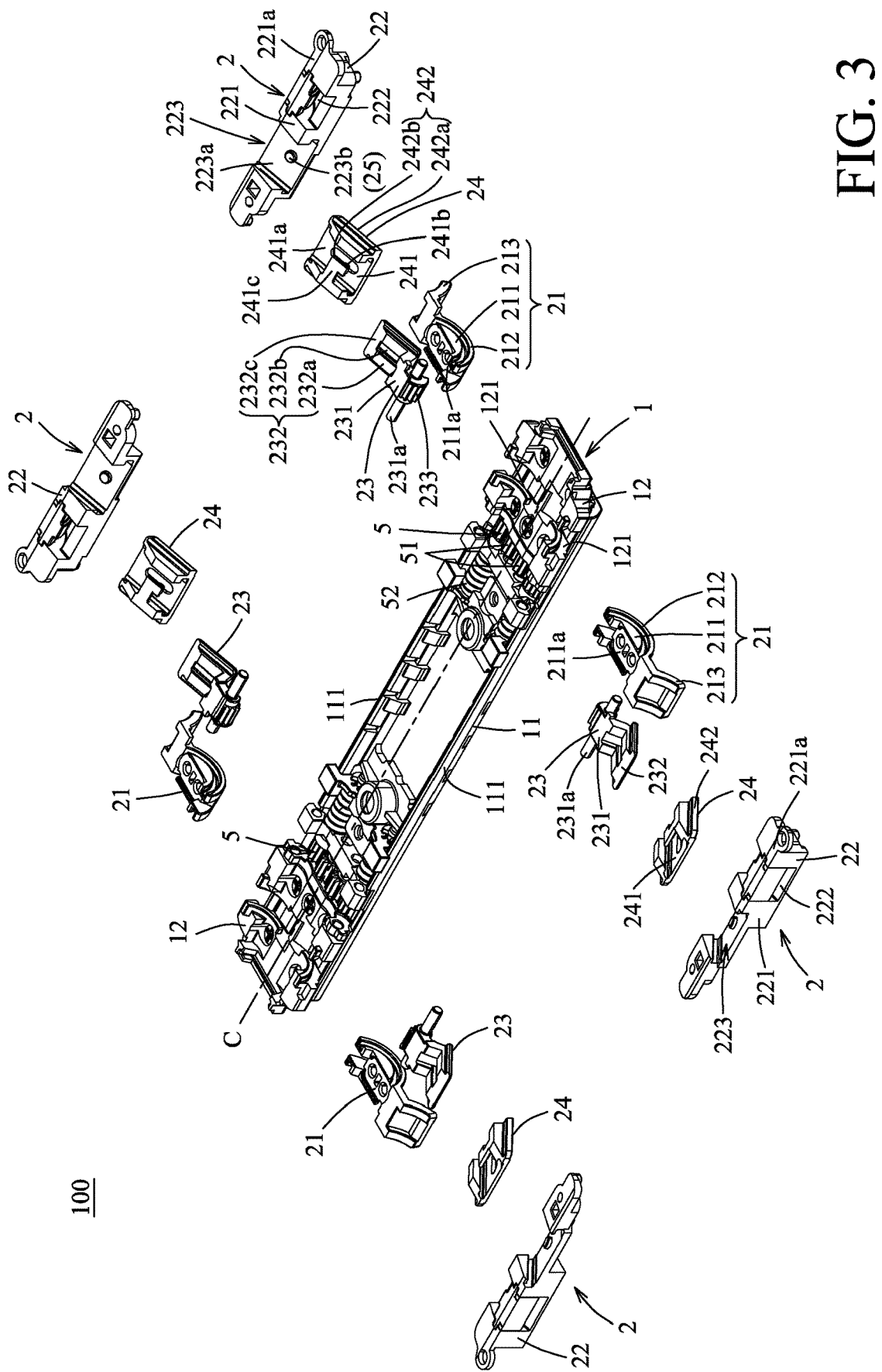
FIG. 3 is a further exploded perspective view of the embodiment, two lateral support plates and a central support plate being removed for the sake of clarity.
Figure 4:
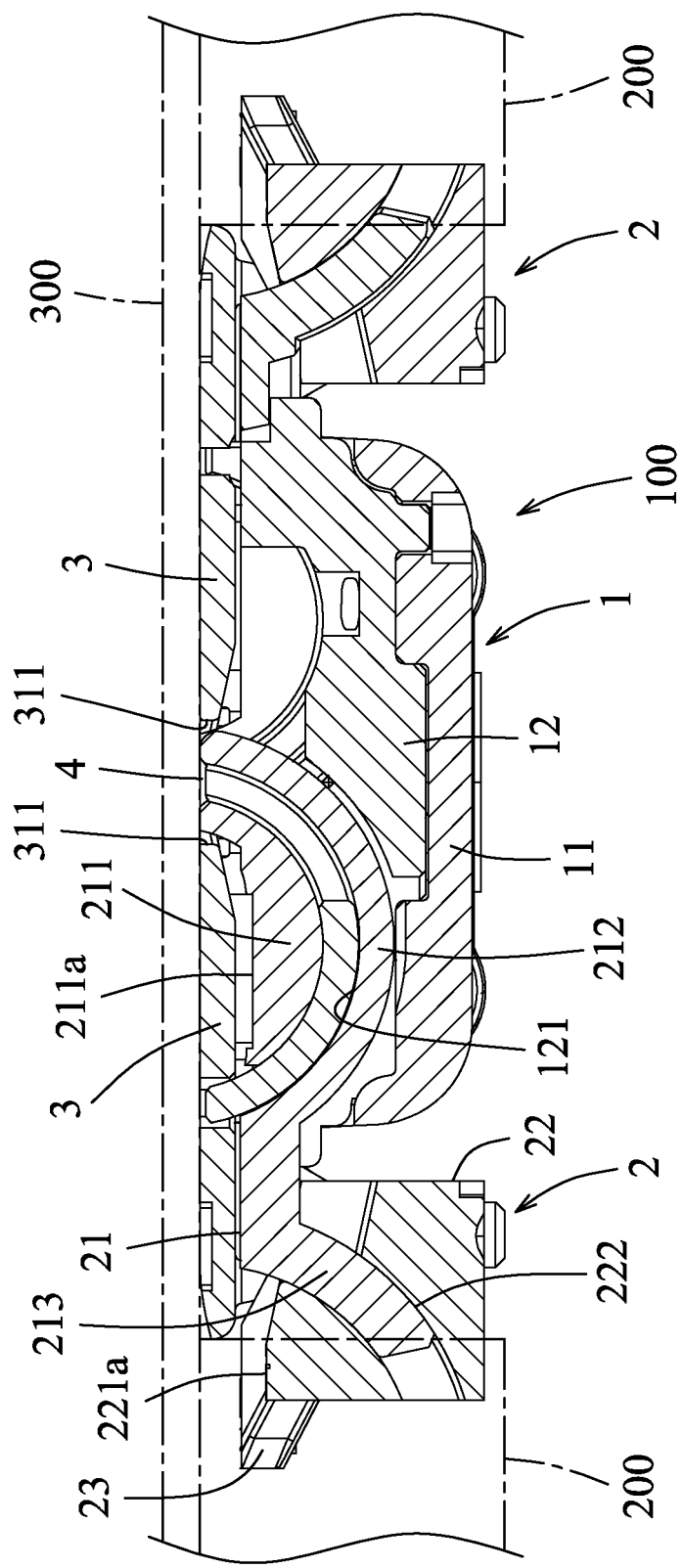
FIG. 4 is a sectional view taken along line IV-IV of FIG. 1.
Figure 5:
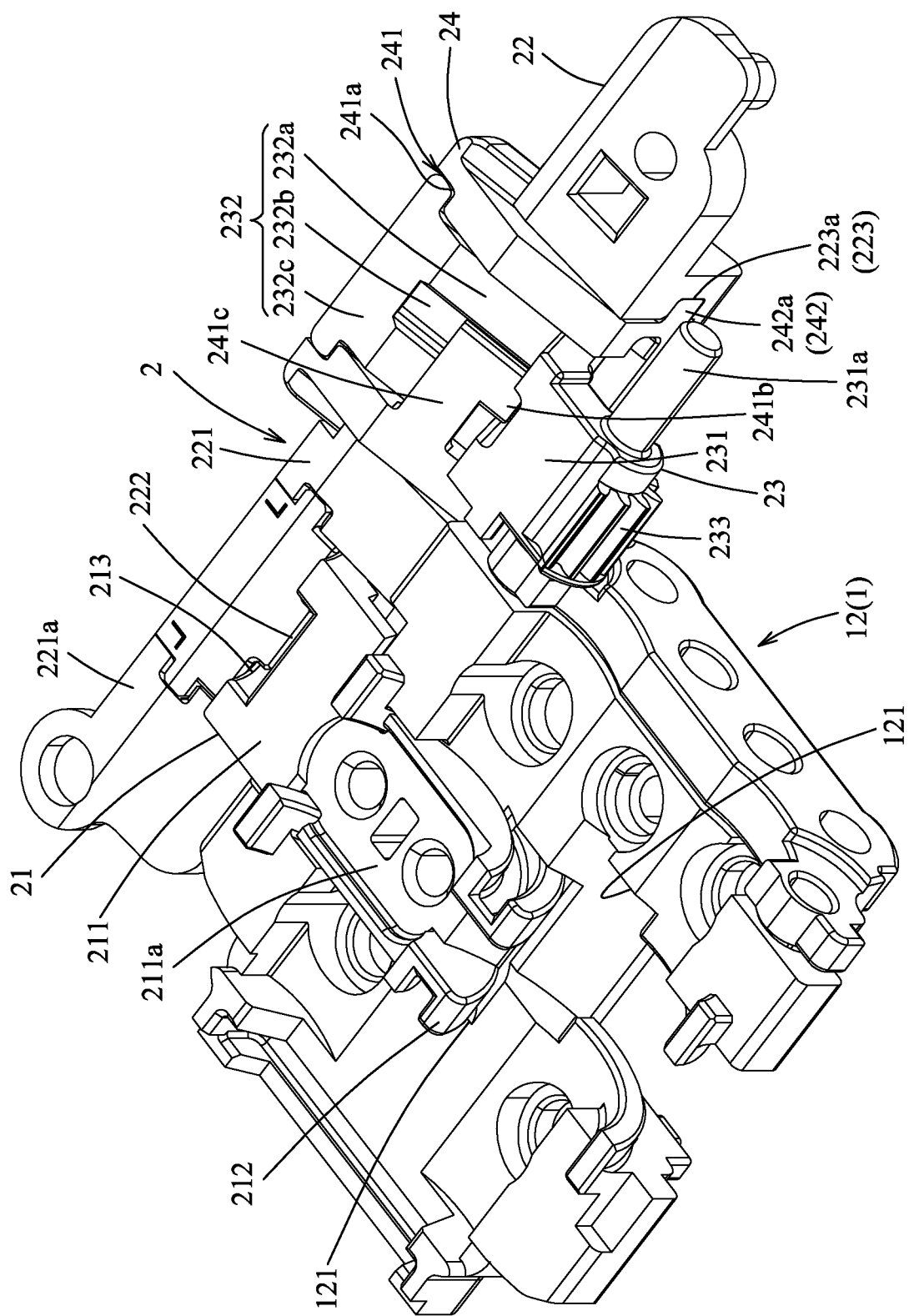
FIG. 5 is a perspective view illustrating a rail bracket and a rotary unit of the embodiment in the unfolded state.
Figure 6:
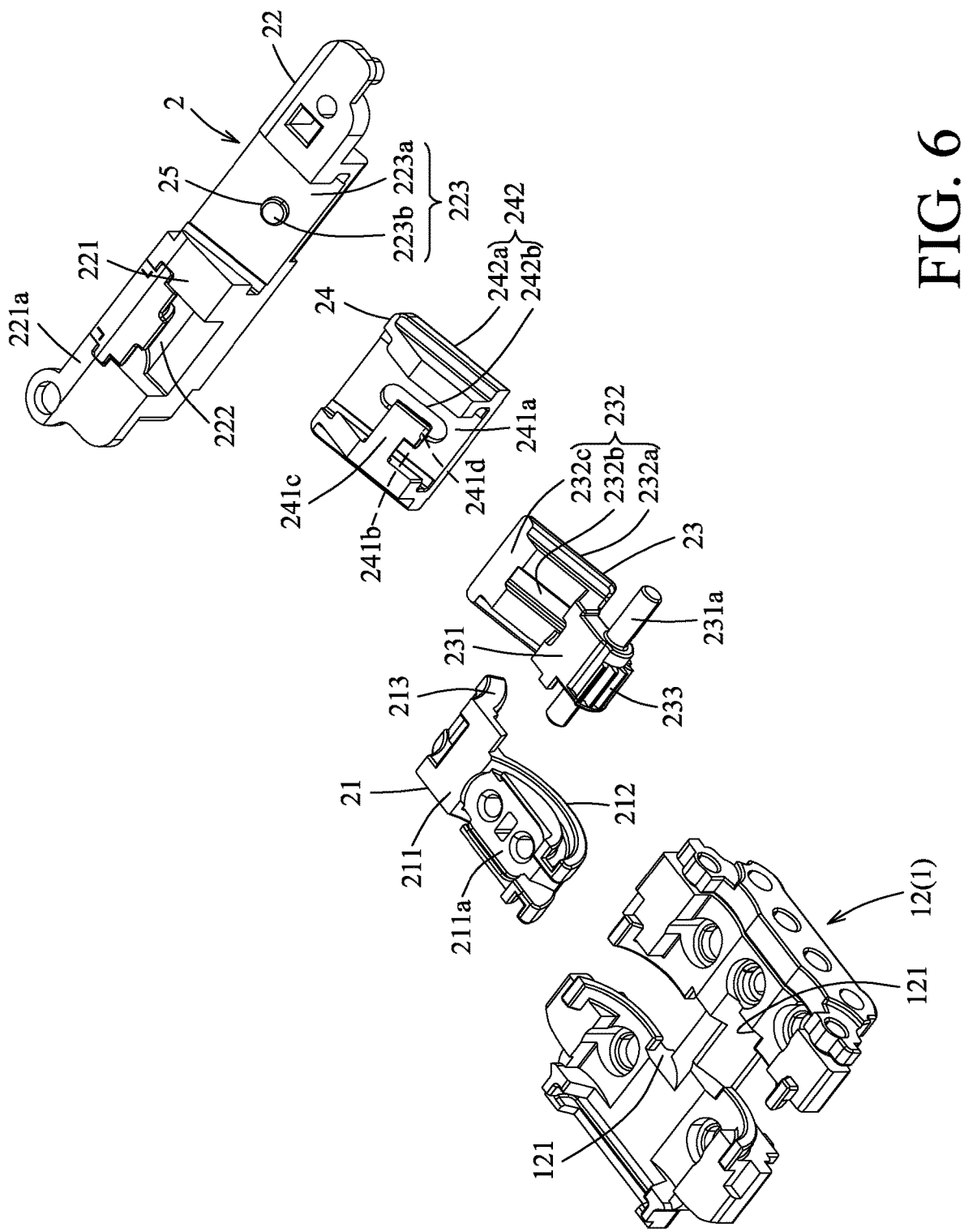
FIG. 6 is an exploded perspective view of FIG. 5.
Figure 7:
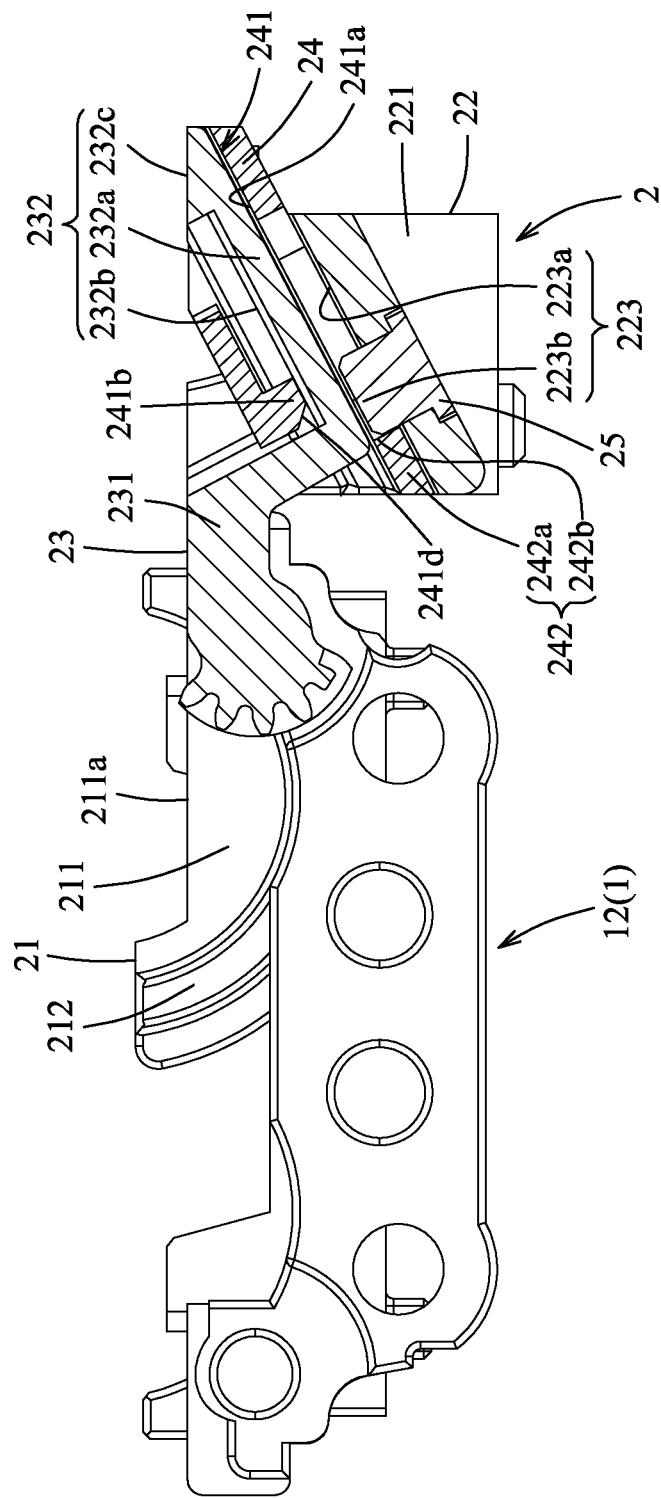
FIG. 7 is a sectional view of FIG. 5.
Figure 9:
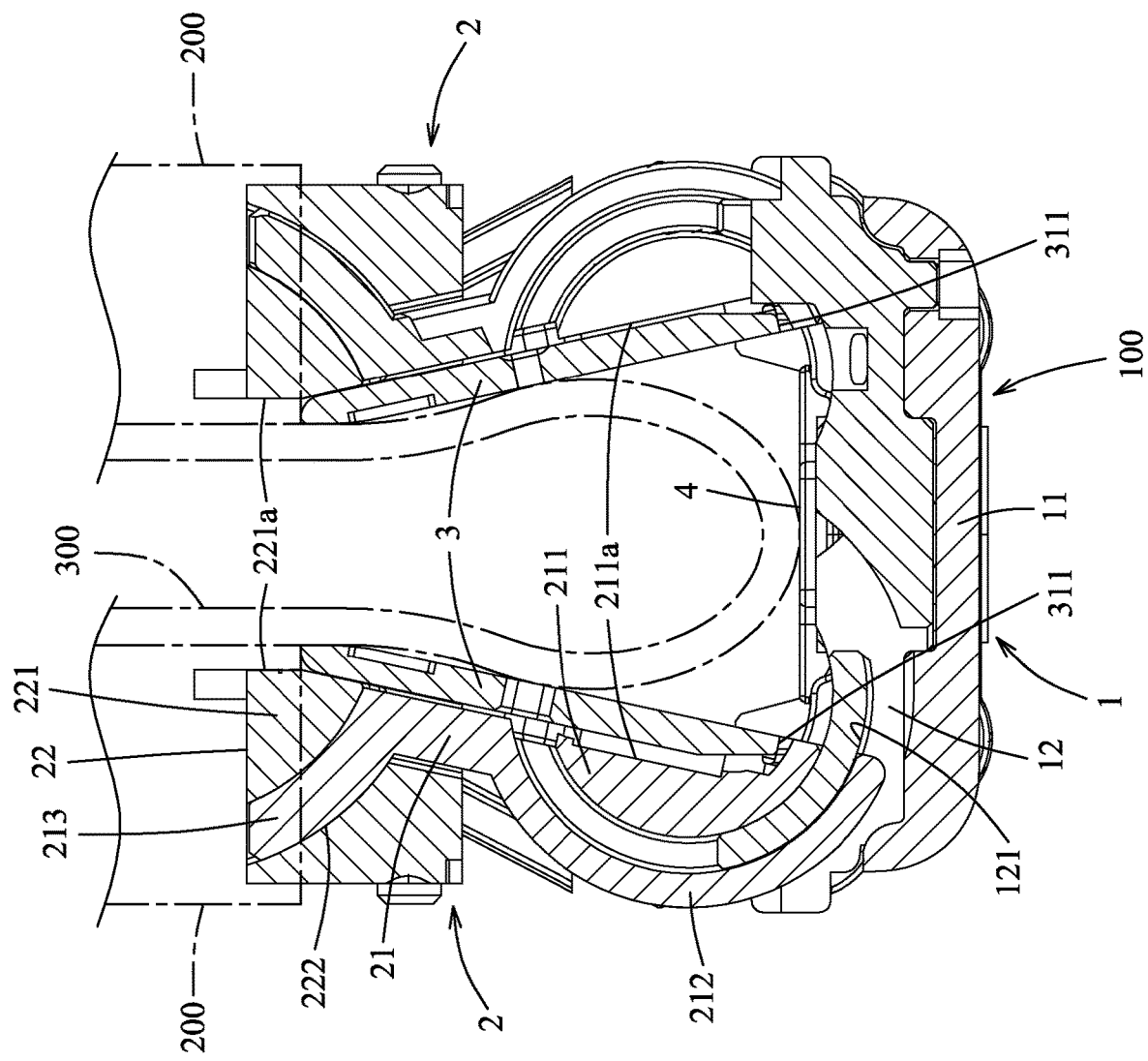
FIG. 9 is a sectional view taken along line IX-IX of FIG. 8.
Figure 10:
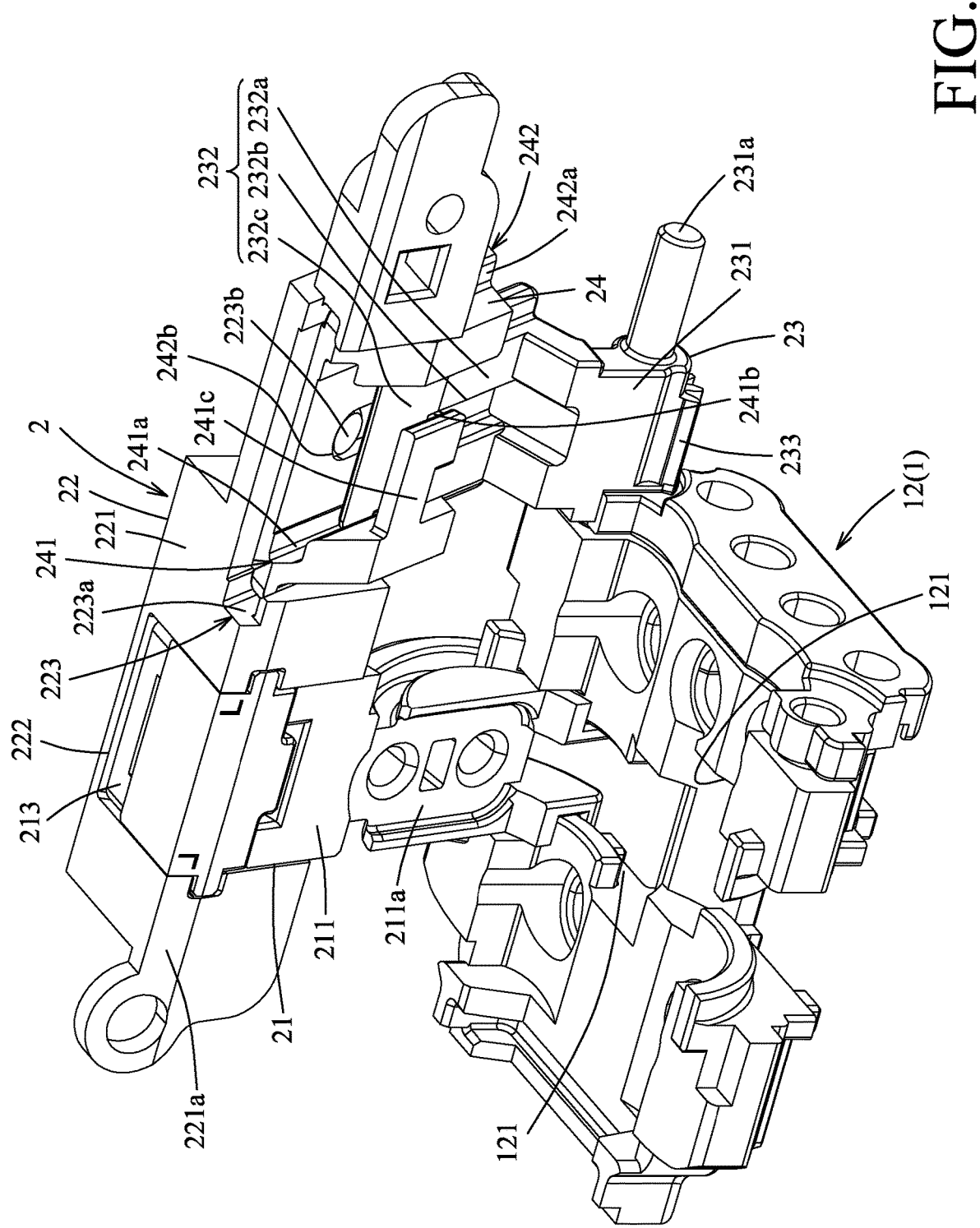
FIG. 10 is a perspective view illustrating the rail bracket and the rotary unit of the embodiment in the folded state.
Figure 11:
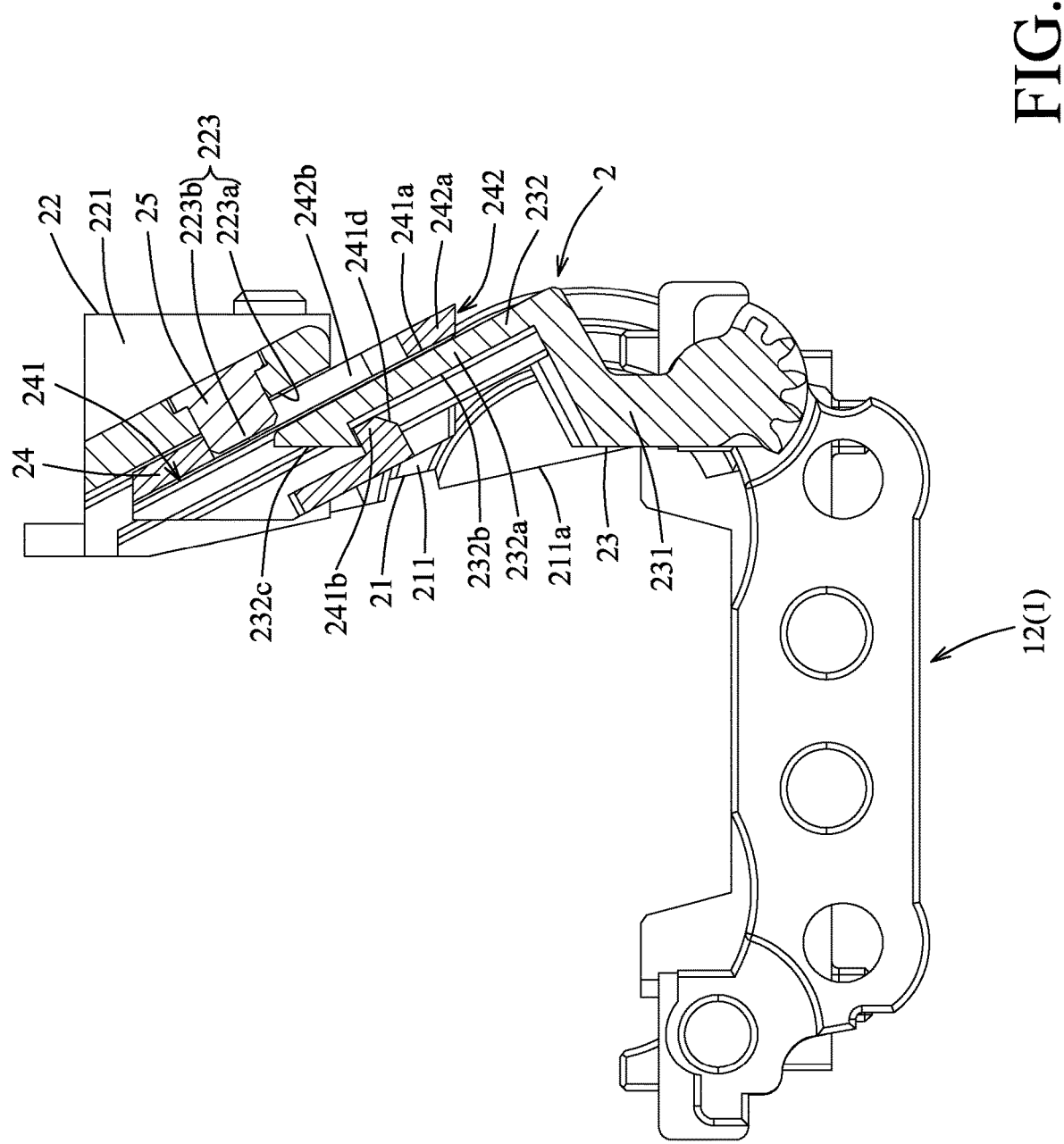
FIG. 11 is a sectional view of FIG. 10.

With reference to FIGS. 3, 8 and 9, during the shifting of each rotary unit 2 from the unfolded state to the folded state, the rail sliding block 22 is slid relative to the corresponding second arcuate rail 213, and is turned relative to the mounting seat 1 through the sliding of the interposed sliding member 24 relative to the rotating bracket 23. With the arcuate sliding and the inclined sliding of the rail sliding block 22, the housing supporting surface (221*a*) of the rail sliding block 22 is moved to be parallel to the housing support surface (221*a*) of the other sliding block 22 so as to bring the housing parts 200 to be in parallel and overlapping with each other.

Figure 2:
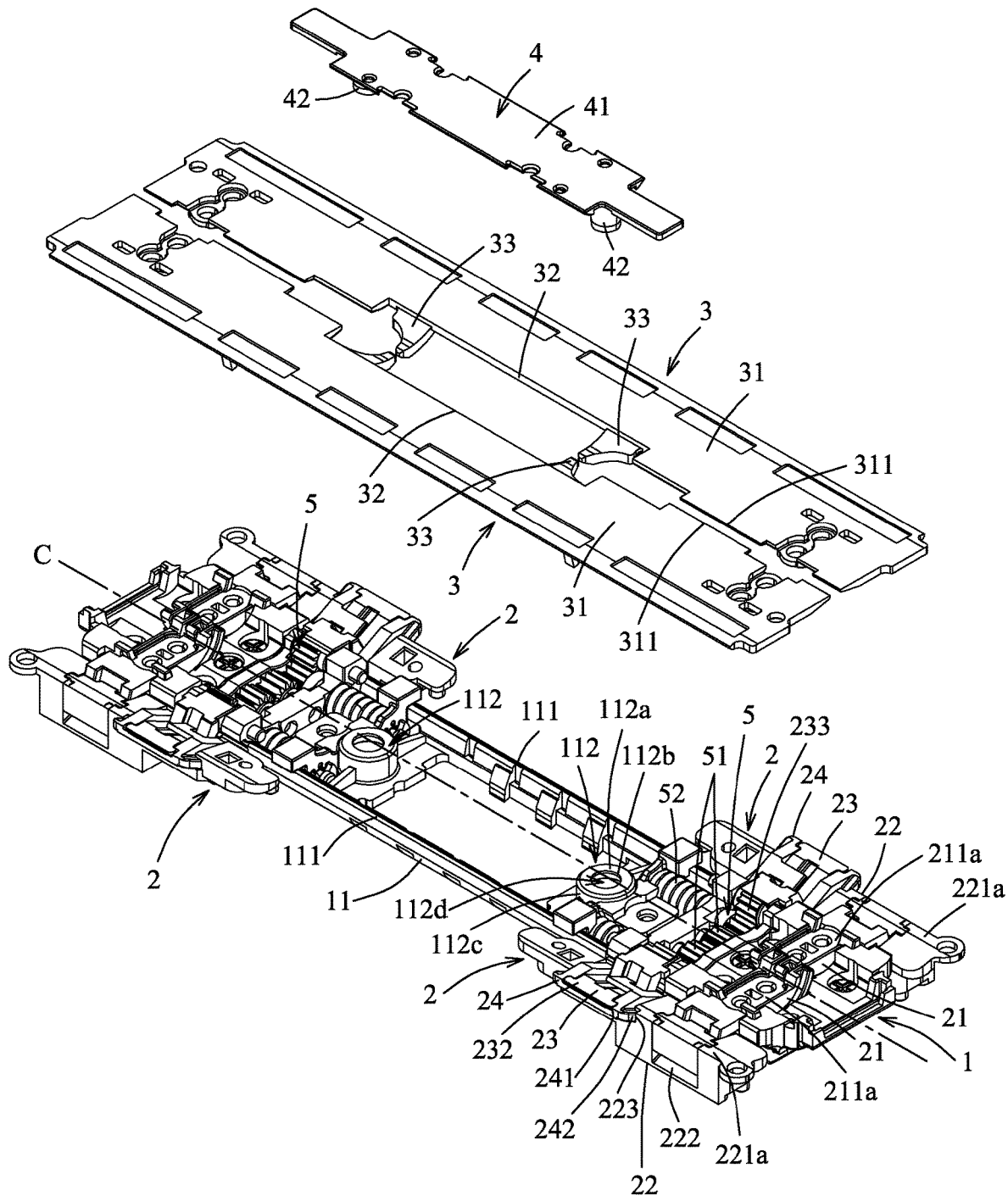
FIG. 2 is an exploded perspective view of the embodiment.

With reference to FIGS. 2 and 3, in this embodiment, the two synchronizing mechanisms 5 are respectively disposed on the rail brackets 12 of the mounting seat 1. Each synchronizing mechanism 5 is connected between the rotating brackets 23 of the two rotary units 2. The synchronizing mechanism 5 includes a plurality of pinions 51 (specifically the number of the pinions 51 is even) which are interposed between and mesh with the toothed portions 233 of the rotating brackets 23, and a torsion unit 52 which is connected with two of the pinions 51. The two synchronizing mechanisms 5 make synchronous turning of the rotary units 2 in opposite rotational directions and provide a frictional torque to retain the rotary units 2 in a desired angular position.

As illustrated, with the interposed sliding member 24 interposed between the rail sliding block 22 and the rotating bracket 23, the sliding of the rail sliding block 22 to the rotating bracket 23 can be steady and firm without the need to elongate (increase the length of) the inclined rail (i.e., the outward inclined sliding portion 223) of the rail sliding block 22 and the inclined rail (i.e., the inward inclined guiding portion 232) of the rotating bracket 23, which renders the hinge 100 more compact and slim. Moreover, through the slidable engagement of the inward key (241*b*) of the inward inclined sliding portion 241 of the interposed sliding member 24 with the inward guideway (232*b*) of the inward inclined guiding portion 232 of the rotating bracket 23, the sliding movement of the interposed sliding member 24 relative to the rotating bracket 23 is guided and limited to avoid removal of the interposed sliding member 24 from the rotating bracket 23. Furthermore, the first guiding slope (232*c*) of the rotating bracket 23 is slidably engaged with the second guiding slope (241*d*) of the interposed sliding member 24 to facilitate the slidable engagement of the inward key (241*b*) in the inward guideway (232*b*) during assembly.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge connectable with two housing parts of a flexible electronic device to allow opening and closing of the housing parts, comprising:
    a mounting seat extending in a lengthwise direction and having two lengthwise edges at two opposite sides of a central line, said mounting seat having two first arcuate slots which extend from the central line toward said lengthwise edges, respectively;
    two rotary units connected with said mounting seat at said two opposite sides of the central line, respectively, said two rotary units being shiftable between an unfolded state and a folded state, each of said rotary units including
        a linking member having a linking body which has a plate supporting surface, a first arcuate rail which extends from said linking body and which is slidably engaged with a respective one of said first arcuate slots, and a second arcuate rail which extends from said linking body away from said first arcuate rail,
        a rail sliding block having a block body which has a housing supporting surface for one of the housing parts to be attached thereto, a second arcuate slot which is formed in said block body and slidably engaged with said second arcuate rail, and an outward inclined sliding portion which is formed on said block body and opposite to said second arcuate slot in the lengthwise direction,
        a rotating bracket pivotally connected with said mounting seat, and having a bracket body and an inward inclined guiding portion which extends from said bracket body to terminate at a terminal end, said inward inclined guiding portion having an inward inclined block, an inward guideway which is formed on said inward inclined block, and a first guiding slope which is formed on said terminal end of said inward inclined guiding portion and adjacent to said inward guideway, and
        an interposed sliding member interposed between said rail sliding block and said rotating bracket, said interposed sliding member having an inward inclined sliding portion which is slidably engaged with said inward inclined guiding portion, and an outward inclined guiding portion with which said outward inclined sliding portion is slidably engaged, said inward inclined sliding portion having an inward inclined slide rail with which said inward inclined block is slidably engaged, an inward key which is disposed on said inward inclined slide rail and is guided in and slidable along said inward guideway, and a second guiding slope which is formed on said second inward key and which is slidably engaged with said first guiding slope to guide slidable engagement of said inward key in said inward guideway,
        wherein, during the shifting of said rotary units from the unfolded state to the folded state, said rail sliding block is slid relative to said second arcuate rail, and is turned relative to said mounting seat through sliding of said interposed sliding member relative to said rotating bracket; and
    two lateral support plates, each securely connected with and supported on said plate supporting surface to be moved with said linking member, wherein, in the unfolded state of said rotary units, said plate supporting surfaces of said linking members are flush with each other and in a horizontal state, and said lateral support plates are disposed to cover said mounting seat, and wherein, in the folded state of said rotary units, said plate support surfaces are inclined to each other in a direction away from said mounting seat to bring said lateral support plates to be inclined to each other, and said housing supporting surfaces of said rail sliding blocks are disposed to face and to be parallel to each other and to be in a vertical state.

2. The hinge of claim 1, wherein said inward inclined sliding portion further has a suspending arm which is connected with said inward key and extends from an inner wall of said inward inclined slide rail such that said suspending arm is deformable to facilitate the slidable engagement of said inward key in said inward guideway.

3. The hinge of claim 1, wherein said outward inclined guiding portion has an outward inclined block, said outward inclined sliding portion of said rail sliding block having an outward inclined slide rail with which said outward inclined block is slidably engaged.

4. The hinge of claim 3, wherein said inward inclined slide rail is in form of a groove which is formed and recessed in an inward wall of said outward inclined block.

5. The hinge of claim 3, wherein said outward inclined guiding portion further has an outward guideway which is formed on said outward inclined block, said outward inclined sliding portion of said rail sliding block further having an outward key which is disposed on and protrudes from an inward wall of said outward inclined slide rail and is guided in and slidable along said outward guideway.

6. The hinge of claim 5, wherein said outward key is in form of a bolt portion of a fastener which extends through said rail sliding block.

7. The hinge of claim 5, wherein said outward key is in form of a shaft of a rivet which extends through said rail sliding block.

8. The hinge of claim 1, further comprising a synchronizing mechanism which is connected between said rotating brackets of said two rotary units, said rotating bracket of each of said rotary units having a toothed portion which is formed on said bracket body away from said inward inclined guiding portion, said synchronizing mechanism including a plurality of pinions which are interposed between and mesh with said toothed portions of said rotating brackets so as to make synchronous turning of said rotary units in opposite rotational directions.

* * * * *